Oct. 8, 1929.  L. H. DEBS  1,730,919
MULTIPLE BAKING PAN
Filed July 2, 1928  2 Sheets-Sheet 1
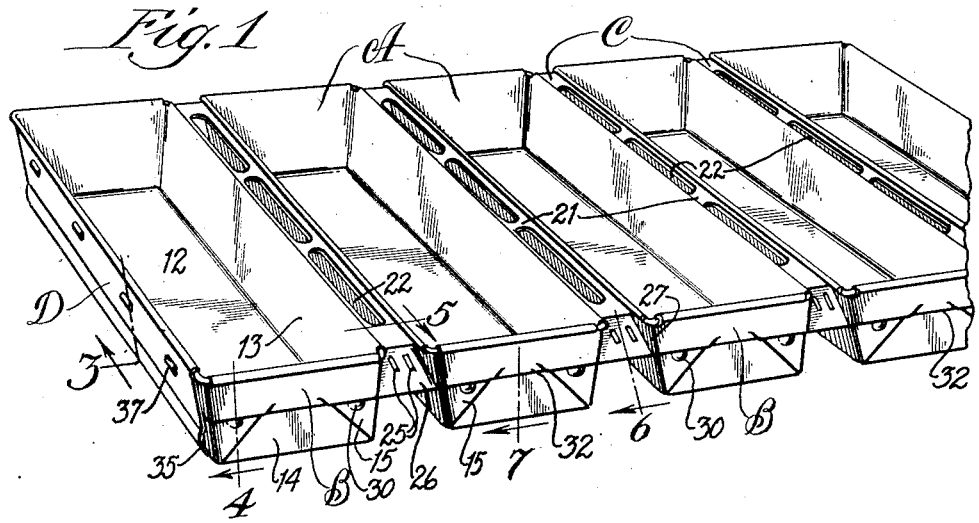
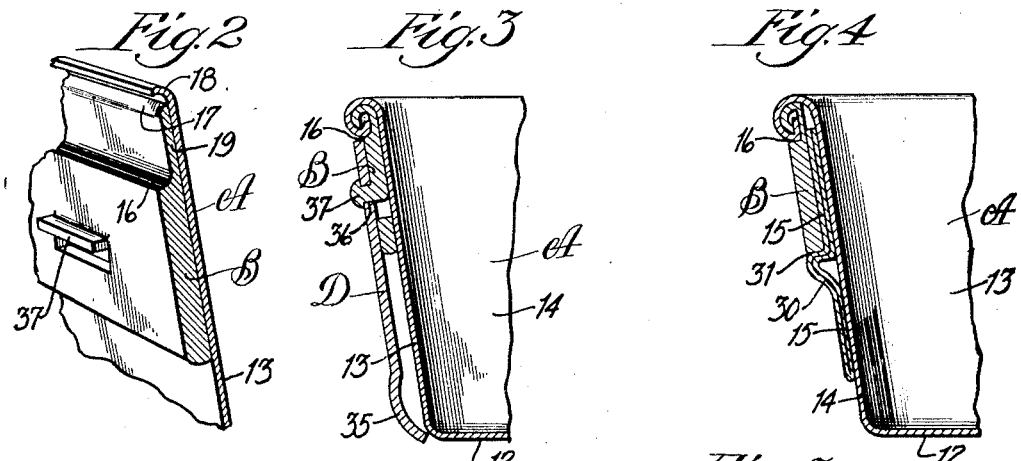
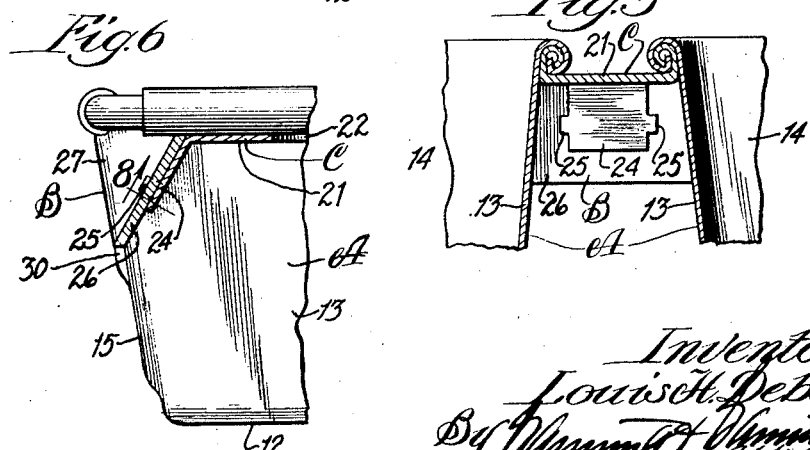
Inventor:
Louis H. Debs, Oct. 8, 1929.  L. H. DEBS  1,730,919
MULTIPLE BAKING PAN
Filed July 2, 1928   2 Sheets-Sheet 2
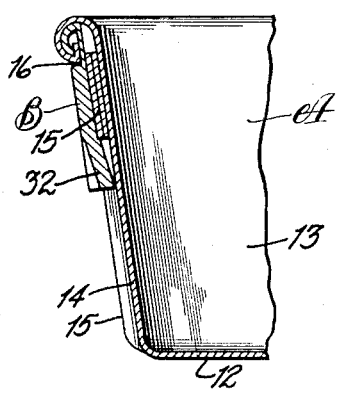
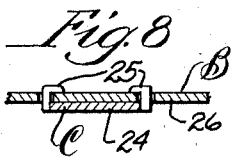
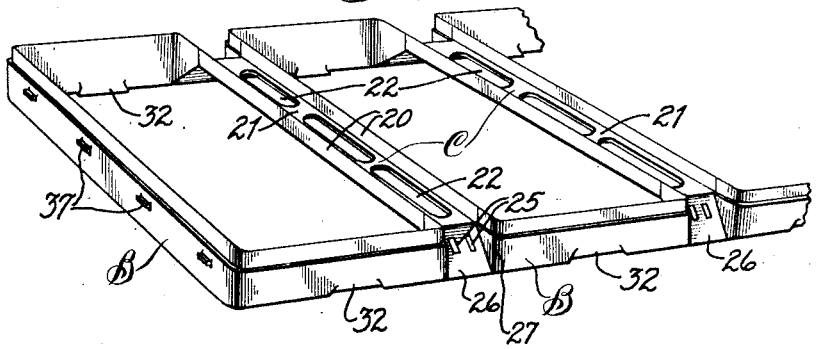
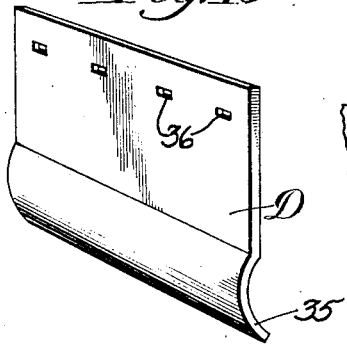
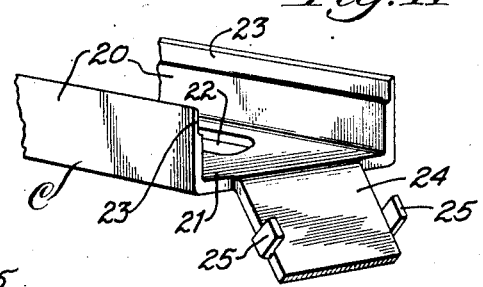

Patented Oct. 8, 1929

1,730,919

UNITED STATES PATENT OFFICE

LOUIS H. DEBS, OF CHICAGO, ILLINOIS

MULTIPLE-BAKING PAN

Application filed July 2, 1928. Serial No. 289,729.

This invention relates to a baking pan of the multiple type such as is used by commercial bakers. The present improvements are directed to the means by which a plurality of pans are joined together within a frame having certain novel characteristics. A suggestive embodiment of the invention is illustrated in the accompanying drawings in the manner following:

Figure 1 is a perspective view of a plurality of baking pans arranged side by side and mounted within a common frame;

Fig. 2, which is a sectional perspective detail view, shows one of the pan sides, together with the supporting band iron frame, both of these parts being represented as they appear prior to interlocking;

Figs. 3, 4, 5, 6 and 7 are sectional details taken, respectively, on lines 3, 4, 5, 6, and 7 of Fig. 1;

Fig. 8 is a sectional detail taken on line 8 of Fig. 6;

Fig. 9 is a view in perspective of a portion of the frame prior to mounting of the pans therewithin;

Fig. 10 is a view in perspective of the end protection plate; and

Fig. 11 is a detail in perspective of one end of a cross brace which is interposed between the pans.

The pans A which are to be joined together within a common frame are of the usual type in that they each comprise a bottom 12 from which upstand outwardly inclined side and end walls 13 and 14 respectively. Such pans are commonly made of tin, and at the corners the excess of material is folded over into two double ply wings 15 disposed adjacent the pan ends. In the respects noted, the present pans may follow the usual construction. The upper edges of the pan sides and ends, however, are not reinforced by a wire, as is common practice, and advantage is taken of this difference to effect a connection between the pans and the supporting frame in the manner which will now be pointed out.

The several pans are adapted to be arranged side by side with narrow intervening spaces, and to be accommodated within a frame which may conveniently consist of a band iron B extending past the ends of the several pans and around the outer sides of the end pans. This band iron is of peculiar cross sectional form in that it is produced initially with a narrow lip 19 extending upwardly from its upper edge and flush with its inner surface. At the base of the lip is a shoulder 16 extending along the outer face of the band iron frame. The upper edge of the lip along its outer face is also chamfered or beveled as at 17.

The upper edges of the sides and ends of the pans are also initially outturned at 18, as best shown in Fig. 2. When the band iron is extended around in the form of a rectangle, as suggested in Figs. 1 and 9, it provides a frame wherein a plurality of pans may be mounted, the outturned edges of the pans overlying the beveled edge of the band iron lip in the manner shown in Fig. 2.

The band iron frame may be reinforced in various ways and at divers places. Between the several pans are braces C which may be of channel formation with spaced parallel side walls 20 upstanding from a horizontal connecting wall 21 wherein are formed a plurality of elongated slots 22 to promote ventilation between the pans. Each of the side walls 20 may also have a lip extension 23 along its upper edge, similar to that provided on the band iron, adapted to be engaged by the proximate overhanging edge of the pan which is mounted within the frame.

At the end of each brace is a tongue 24 slanted downwardly and provided along opposite edges with upstanding lugs 25. These tongues are adapted to engage with slanted inset faces 26 which are inset from the band iron at points between the pans supported therein. Adjacent these inset faces the metal is drawn to provide also triangular walls 27 which are disposed adjacent the corners of the proximate pans to reinforce and protect the same, and also to center the pans in position lengthwise of the band iron frame. The braces C may be joined to the band iron by extending the lugs 25 of the tongue through slots in the inset faces 26 of the latter, the lugs being thereafter clinched or upset to provide a secure and rigid connection (see Fig. 6). By connecting the braces in place the band iron frame is reinforced at a number of points intermediate of its ends.

After the pans are in their respective mountings as defined by the band iron and connecting braces, a die operation is performed to curl the upper pan edges and associated lips so as to interlock one with the other. When this has been done the clinched parts assume a position somewhat as represented in Figs. 3 and 4. This form of connection dispenses entirely with the usual wire reinforcement around the edges of a pan.

Referring particularly to Fig. 4, the two ply wings at each corner of the pan may desirably be embossed outwardly at 30 to provide a shoulder 31 on which may be rested the lower edge of the band iron B. This assures a correct positioning of the band prior to the curling of the pan edges upon the frame, and also affords a rounded support at the lower edge of the band iron which prevents sharp contact with any objects. I may find it desirable also to swedge in a portion 32 adjacent the lower edge of the band iron at points which approximately coincide with the oblique edges of the corner wings 15. These swedged in portions of the band iron engage with the pan ends between the wings, whereby to afford an end support thereto, and prevent ingress of dirt beneath the frame.

At the ends of the frame are arranged protection plates D extending from a point below the interlocking curl at the upper edge to the bottom edges of the pan or slightly therebelow. The lower edges of the protection plates may be rounded inwardly at 35, as suggested in Fig. 3. To secure each protection plate in place, I may provide therein a series of slots 36 adapted to receive therethrough lugs 37 which are struck out from the band iron, the outer ends of the lugs being clinched or upset upon the protection plate to effect a secure connection therewith.

From the preceding description, it will be noted that my invention comprises a frame of connected elements—the braces and band iron—forming a series of mountings, and that the several pans which are wireless are interlocked fixedly in place by a curling operation which dispenses entirely with any additional parts. The protection thus afforded to the pans is secure, and they may be handled safely as a unit in the manner which customarily obtains in the baking industry.

I claim:

1. A multiple baking pan in which is comprised a plurality of pans arranged side by side in a row, a band iron frame surrounding the pan row, the upper edges of each pan being initially outturned to overlie the corresponding edges of the band iron which is reduced in thickness at such point to substantially the thickness of the pan wall, and an interlocking connection between the pans and the band iron frame formed by curling the upper edges of these two parts, one upon the other, the curling of these parts constituting the sole reinforcement along the pan edges and corners adjacent the frame.

2. A multiple baking pan in which is comprised a plurality of pans arranged side by side in a row, and a band iron frame surrounding the pan row, the band iron having a lip extending beyond its upper edge flush with its inner face whereby to provide a shoulder at the lip base, the upper pan edges being outturned to overlie the lip and adapted to be curled thereupon to interlock therewith, the curl being rested against the shoulder of the band iron, and affording the only reinforcement along the edges and corners adjacent thereto.

3. A multiple baking pan in which is comprised a plurality of pans arranged side by side in a row, a band iron frame surrounding the pan row, braces extending across the frame between the pans and serving to space the latter apart a definite distance, means connecting the braces to the band iron between the pans, and an inseparable connection between the upper edges of the several pans and the proximate edges of the braces and band iron formed by curling these edges one with the other.

4. A multiple baking pan in which is comprised a plurality of pans arranged side by side in a row, a band iron frame surrounding the pan row, cross braces extending between opposite sides of the band iron and interposed between the pans to space the same apart, the band iron being inset slantingly between the pans whereby to reinforce the corners thereof.

5. A multiple baking pan in which is comprised a plurality of pans arranged in a row side by side in slightly spaced relation, a band iron frame surrounding the pan row, portions of the band iron being inset between the pans to afford protection to the corners thereof, and means interlocking the pans with the band iron frame.

6. A multiple baking pan in which is comprised a plurality of pans arranged side by side in a row in slightly spaced relation, braces extending between the pans having downwardly slanting ends, a band iron frame surrounding the pan row having portions of itself inset between the pans and slanting in conformity with the ends of the braces, means connecting the braces and band iron at the points of engagement therebetween, and a connection between the several pans and the proximate braces and band iron frame.

7. A multiple baking pan in which is comprised a plurality of pans arranged side by side in a row, the pans being provided at their ends with wings which are disposed adjacent the outer faces thereof, there being in each wing an outwardly extending crimp providing a shoulder, a band iron frame extending around the pans and resting upon the wing shoulders, a lip upwardly extending beyond the band iron adjacent the inner face thereof, the proximate edge of each pan being outturned to overlie the upper edge of the lip, and a connection between the pans and the band iron formed by curling the upper edges of the pans and lip together whereby the pans are interlocked with the frame.

8. A multiple baking pan in which is comprised a plurality of pans arranged side by side in a row, a band iron frame surrounding the pan row, braces extending between the pans and connected at their ends with the band iron frame to form continuations of the upper edge thereof, an interlocking connection extending continuously along the edges of the pan with the braces and band iron frame and providing for the pan edges the sole reinforcement, and protection plates at the ends of the pan row, there being means integral with the band iron frame for securing the protection plates in place.

9. A multiple baking pan in which is comprised a plurality of pans arranged side by side in a row, a band iron frame surrounding the pan row and having a reduced upstanding flange, and a curling connection between the pans and the flange extending continuously for the length of the engaging surfaces of each and constituting the sole reinforcement for the pan edges adjacent the band iron.

10. A multiple baking pan in which is comprised a plurality of pans arranged side by side in a row, a band iron frame surrounding the pan row and having an upstanding flange, braces having upstanding flanges extending crosswise of the frame and connected thereto between the pans, and a curling connection between the several pans and braces and band iron frame extending continuously along the engaging surfaces thereof and constituting the sole reinforcement for the pan edges.

11. A multiple baking pan in which is comprised a plurality of pans arranged side by side in a row, a band iron frame surrounding the pan row and extending inwardly between the pans, braces extending crosswise of the frame and connected thereto between the pans, and curling connections between the braces and pans extending the length of the engaging surfaces of each and constituting the sole reinforcement for the pan edges adjacent the braces.

12. The method of making a multiple baking pan unit which comprises a plurality of pans arranged side by side in a row within a band iron frame having its upper edge reduced to substantially the thickness of the pan wall and extending lengthwise along the pan row, consisting in forming the several pans with outturned leads upon the upper edges thereof, in arranging the band iron against the pans with the upper reduced edge of the band iron adjacent the lead, and in curling the lead and upper reduced band iron edge outwardly and around to an extent sufficient to interlock the lead between the curled edge and side of the band iron frame.

13. The method of uniting a plurality of pans to a common band iron having its upper edge reduced to substantially the thickness of the pan wall which consists in forming the several pans with leads along their edges which are to be joined to the band iron, in positioning the band iron with its upper reduced edge immediately adjacent the leads of such edges, and in curling the several leads and upper band edge outwardly and around to an extent sufficient to interlock the leads between the curled edge and sides of the band iron.

14. The method of reinforcing a pan edge which consists in forming the pan with an outturned lead along its edge, in positioning a band iron having its upper edge reduced to substantially the thickness of the pan wall with its upper edge immediately adjacent the lead, and in curling the lead and upper reduced band edge outwardly and around to an extent sufficient to interlock the lead between the curled edge and side of the band iron.

15. A multiple baking pan in which is comprised a plurality of pans arranged side by side in a row, a continuous band iron frame having an upstanding marginal flange surrounding each pan of the row, the upper edges of said pans and band being outwardly rolled together to provide a reinforced rolled edge at the sides, ends and corners of the pan.

16. A multiple baking pan in which is comprised a plurality of pans having rolled upper edges arranged side by side in a row, each of the pans having wings folded adjacent the outer faces of its ends, a band iron frame surrounding the pan row and resting adjacent the wings, means extending inwardly from the band iron between the wings to engage with the pan ends, said band iron having an upstanding reduced marginal flange interlocking with and reinforcing the rolled upper edges and corners of the pans.

In testimony whereof, I have hereunto set my hand and affixed my seal this 29th day of June, 1928.

LOUIS H. DEBS.